Nov. 7, 1933.           L. V. FOSTER           1,934,599
                       MICROSCOPE OBJECTIVE
                       Filed Sept. 30, 1931
CHROMATICALLY CORRECTED
FOR ULTRA-VIOLET AND
VISIBLE LIGHT RAYS.
LEON V. FOSTER
INVENTOR Patented Nov. 7, 1933

1,934,599

UNITED STATES PATENT OFFICE 1,934,599

MICROSCOPE OBJECTIVE

Leon V. Foster, Irondequoit, N. Y., assignor to Bausch & Lomb Optical Company, Rochester, N. Y., a corporation of New York Application September 30, 1931
Serial No. 566,177

3 Claims. (Cl. 88—57)

This invention relates to microscopes and more particularly it has reference to microscope objectives which are used in making photomicrographs.

Since the resolving power of a microscope objective increases directly in proportion to any decrease in the wave length of light used, ultraviolet light has been used in the practice of photomicrography when greater resolution is desired. It is also well known that certain organic substances are opaque, or partially opaque, to ultraviolet light so that by illuminating an object with such light it is possible to bring out structure which is invisible under ordinary illumination. Since ultra-violet light has short wave lengths and lies in the invisible part of the spectrum, it is not possible to make a direct, visual observation of an object which is thusly illuminated but resort must be had to photographic methods since ultra-violet light has an actinic effect on a photographic emulsion.

Perhaps the greatest practical difficulty in using ultra-violet illumination for photomicrography is that it is impossible to focus the instrument by direct visual observation. To overcome this difficulty it has been proposed to use a searcher eye piece carrying a fluorescent screen on which the image may be directly observed, but in actual practice it is very difficult to obtain an exact focus by this method. Another method is to take a series of test exposures on a photographic plate, moving the fine adjustment of the microscope by a known amount between two successive exposures so as to focus on a series of planes. The test plate is then developed and the proper focus is determined from an inspection of the series of images. This is obviously a laborious method that requires considerable time.

One of the objects of my invention is to provide means for facilitating the focusing of a microscope when employing invisible light rays for illumination of an object to be photographed. Another object is to provide an objective which is chromatically corrected for light rays which are visible and invisible. A further object is to provide a microscope objective which is chromatically corrected for light rays of two different wave lengths, one of which lies in the visible and the other of which lies in the invisible part of the spectrum. Other objects and advantages will be apparent from the description of my invention.

I accomplish the objects of my invention by designing an objective lens so that it is corrected for two colors, one of which lies in the invisible part of the spectrum and the other of which lies in the visible part of the spectrum. Thus, for example, my invention has been embodied in a microscope objective, comprising elements A and B, as shown in the figure, which is spherically corrected and chromatically corrected for light rays whose wave lengths are 365 millimicrons and and 546 millimicrons. In making photomicrographs with this objective a mercury vapor lamp may be used as a light source. A suitable mercury green filter is used with the light source and the instrument is focused so that a clear, sharp, visible image is obtained. The filter is then exchanged for one which transmits light having a wave length of 365 millimicrons and the exposure is made. Thus, it is possible to focus with visible light rays and obtain a sharp photographic image with the invisible light rays.

From the foregoing it will be apparent that I am able to attain the objects of my invention and provide means for facilitating the focusing operation when making photomicrographs with ultraviolet light as a source of illumination. Although I have described an objective which is corrected for certain specified wave lengths in the visible and invisible, it is, of course, to be understood that I may correct an objective for light of other wave lengths.

I claim:

1. An objective which is chromatically corrected for light rays having a plurality of wave lengths, one of which lies in the visible portion of the spectrum and one of which lies in the invisible portion of the spectrum.

2. An objective which is chromatically corrected for light rays having wave lengths of substantially 365 millimicrons and 546 millimicrons.

3. An objective which is chromatically corrected for light rays of different wave lengths, one of which lies in the visible portion of the spectrum and another of which lies in the invisible portion of the violet end of the spectrum.

LEON V. FOSTER.